(12) United States Patent
Shah et al.

(10) Patent No.: US 12,325,143 B2
(45) Date of Patent: *Jun. 10, 2025

(54) METHOD FOR DEPLOYING A ROBOTIC SYSTEM TO SCAN INVENTORY WITHIN A STORE BASED ON LOCAL WIRELESS CONNECTIVITY

(71) Applicant: Simbe Robotics, Inc., South San Francisco, CA (US)

(72) Inventors: Mirza Akbar Shah, San Francisco, CA (US); Cem Ersoz, South San Francisco, CA (US); Jariullah Safi, South San Francisco, CA (US); Bradley Bogolea, South San Francisco, CA (US)

(73) Assignee: Simbe Robotics, Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,699

(22) Filed: Feb. 12, 2024

(65) Prior Publication Data

US 2024/0261977 A1    Aug. 8, 2024

Related U.S. Application Data

(63) Continuation of application No. 17/169,327, filed on Feb. 5, 2021, now Pat. No. 11,897,148.

(Continued)

(51) Int. Cl.
*B25J 9/16* (2006.01)
*B25J 13/00* (2006.01)
*G06Q 10/087* (2023.01)

(52) U.S. Cl.
CPC .......... *B25J 9/1697* (2013.01); *B25J 9/1674* (2013.01); *B25J 9/1679* (2013.01); *B25J 13/006* (2013.01); *G06Q 10/087* (2013.01)

(58) Field of Classification Search
CPC ...... B25J 9/1697; B25J 9/1674; B25J 9/1679; B25J 13/006; G06Q 10/087;
(Continued)

(56) References Cited

U.S. PATENT DOCUMENTS 9,527,217 B1 * 12/2016 Lowy ................ G06Q 30/0617
2018/0293543 A1 * 10/2018 Tiwari ................ H04W 4/35

* cited by examiner

*Primary Examiner* — Abby Y Lin
*Assistant Examiner* — Dylan M Katz
(74) *Attorney, Agent, or Firm* — Run8 Patent Group, LLC; Peter Miller

(57) ABSTRACT

One variation of a method for deploying a mobile robotic system to scan inventory structures within a store includes: dispatching the mobile robotic system to navigate along inventory structures within the store during a setup cycle; at the mobile robotic system, while navigating along the inventory structures during the setup cycle, capturing a set of wireless connectivity metrics representing connectivity to a first wireless network; assembling the set of wireless connectivity metrics into a wireless connectivity map of the store; estimating a processing duration from start of the scan cycle to transformation of images of the inventory structures, captured by the mobile robotic system, into a stock condition of the store; and dispatching the mobile robotic system to autonomously capture images of the inventory structures within the store during a scan cycle preceding a scheduled restocking period in the store based on the processing duration.

20 Claims, 8 Drawing Sheets

Related U.S. Application Data

(60) Provisional application No. 62/970,701, filed on Feb. 5, 2020.

(58) Field of Classification Search
CPC .............. G05D 1/0225; G05D 1/0246; G05D 1/0282; G05D 1/0274; G06V 20/10
See application file for complete search history.

METHOD FOR DEPLOYING A ROBOTIC SYSTEM TO SCAN INVENTORY WITHIN A STORE BASED ON LOCAL WIRELESS CONNECTIVITY

CROSS-REFERENCE TO RELATED APPLICATIONS

This application is a continuation application of U.S. patent application Ser. No. 17/169,327, filed on 5 Feb. 2021, which claims the benefit of U.S. Provisional Application No. 62/970,701, filed on 5 Feb. 2020, each of which is incorporated in its entirety by this reference.

This application is related to U.S. patent application Ser. No. 15/600,527, filed on 19 May 201, and to U.S. patent application Ser. No. 15/347,689, filed on 9 Nov. 2016, each of which is incorporated in its entirety by this reference.

TECHNICAL FIELD

This invention relates generally to the field of stock keeping and more specifically to a new and useful method for deploying a robotic system to scan inventory within a store based on local wireless connectivity in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
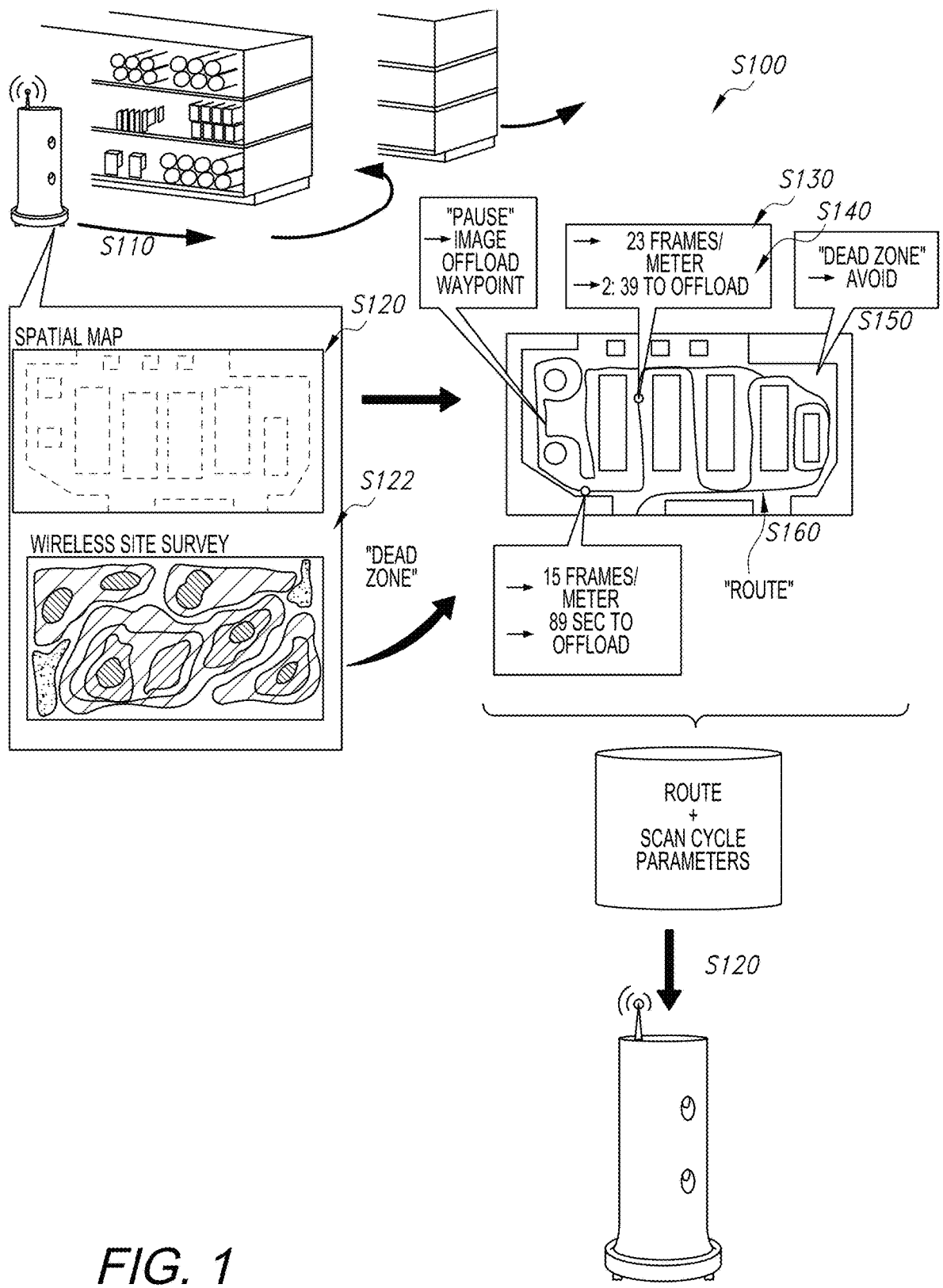
FIG. 1 is a flowchart representation of a method.

As shown in FIG. 1, a method S100 for deploying a robotic system to scan inventory within a store based on local wireless connectivity includes: deploying the robotic system to autonomously navigate through the store during a mapping cycle in Block S110; accessing a spatial map generated based on depth data captured by the robotic system during the mapping cycle in Block S120; accessing a wireless connectivity map generated based on connectivity data of a wireless network captured by the robotic system during the mapping cycle in Block S122; defining a set of image capture parameters along inventory structures in the store based on inventory structure representations detected in the spatial map in Block S130; estimating wireless network connectivity requirements to upload images captured by the robotic system according to the set of image capture parameters along inventory structures in the store in Block S140; detecting, in the wireless connectivity map, a particular region in the store exhibiting low wireless network connectivity in Block S150; calculating a route, along inventory structures in the store, that aligns wireless network connectivity requirements to wireless network connectivity represented in the wireless connectivity map and that excludes the particular region in the store in Block S160; and scheduling the robotic system to execute a scan cycle in the store according to the route and the set of image capture parameters in Block S110.

2. Applications

Generally, Blocks of the method S100 can be executed by a computer system: to dispatch a robotic system to navigate throughout a store, generate a spatial map representing locations of inventory structures within a store, and generate a wireless network map (or "wireless site survey") representing qualities of a wireless network throughout the store; to calculate a route—through the store—that satisfies inventory structure imaging objectives (e.g., maximum inventory structures image) and wireless connectivity constraints (e.g., real-time wireless image offload to a remote database for processing, a maximum duration of wireless connectivity loss) based on the spatial map and the wireless connectivity map; and to then deploy the robotic system to navigate along this route and to image inventory structures in the store according to this route during a next scan cycle.

In particular, in order to minimize latency from a start of a scan cycle to calculation of a stock condition of the store, the robotic system can upload images—depicting inventory structures throughout the store and captured by the robotic system as it navigates along the route calculated by the remote computer system—and system data (or "heartbeat" data of the robotic system, including its location, orientation, battery level, and system checks) to a remote database via a wireless local area network within the store in (near) real-time as the robotic system executes a scan cycle. Upon receipt, the remote computer system can then process these images to derive types and quantities of products on inventory structures in the store and then return a realogram of these imaged inventory structures to a store associate or store manager, etc. upon receipt of a last image from the robotic system during this scan cycle. Therefore, the computer system (e.g., a remote server, a computer network) can execute Blocks of the method S100 to automatically structure a route, image capture parameters, image offload parameters, and wireless connectivity loss periods for a robotic system deployed to the store—based on limited spatial and wireless connectivity captured by the robotic system during an initial mapping cycle when the robotic system is first deployed to the store—in order minimize a time from start of this scan cycle to completion of the realogram for the store (hereinafter the "processing duration") and in order to ensure minimum connectivity loss for the robotic system throughout this scan cycle.

The remote computer system can also: predict locations of new wireless network access points that may enable the robotic system to reach additional inventory structures in the store while satisfying wireless connectivity constraints and/or that may reduce time from start of a scan cycle to completion of a realogram of the store; annotate the wireless connectivity map of the such with effects of installation of new wireless network access points at such locations on performance of the robotic system; serve this annotated wireless connectivity map to a robotic system operator, store manager, or other administrator; and/or recommend installation of additional wireless network access points at such targeted locations in the store in order to improve performance of the robotic system.

The robotic system can later execute these image capture parameters and image offload parameters while navigating along this route during a later scan cycle in order to capture images of many (or all) inventory structures throughout the store and return these images to the remote computer system—for transformation into a stock condition of the store—with limited delay while operating within wireless connectivity constraints defined for robotic system operation within a store.

Furthermore, the remote computer system can implement similar methods to revise image capture parameters, image offload parameters, and a route through the store following conclusion of a scan cycle or in real-time as the robotic system executes this scan cycle.

Therefore, the computer system can execute Blocks of the method S100 to commission a robotic system to a store and to coordinate routing, image capture, and data offloading for the robotic system based on wireless connectivity in the store and to recommend changes to wireless connectivity in the store in order to enable or improve autonomous operation of the robotic system within the store.

3. System

Figure 2:
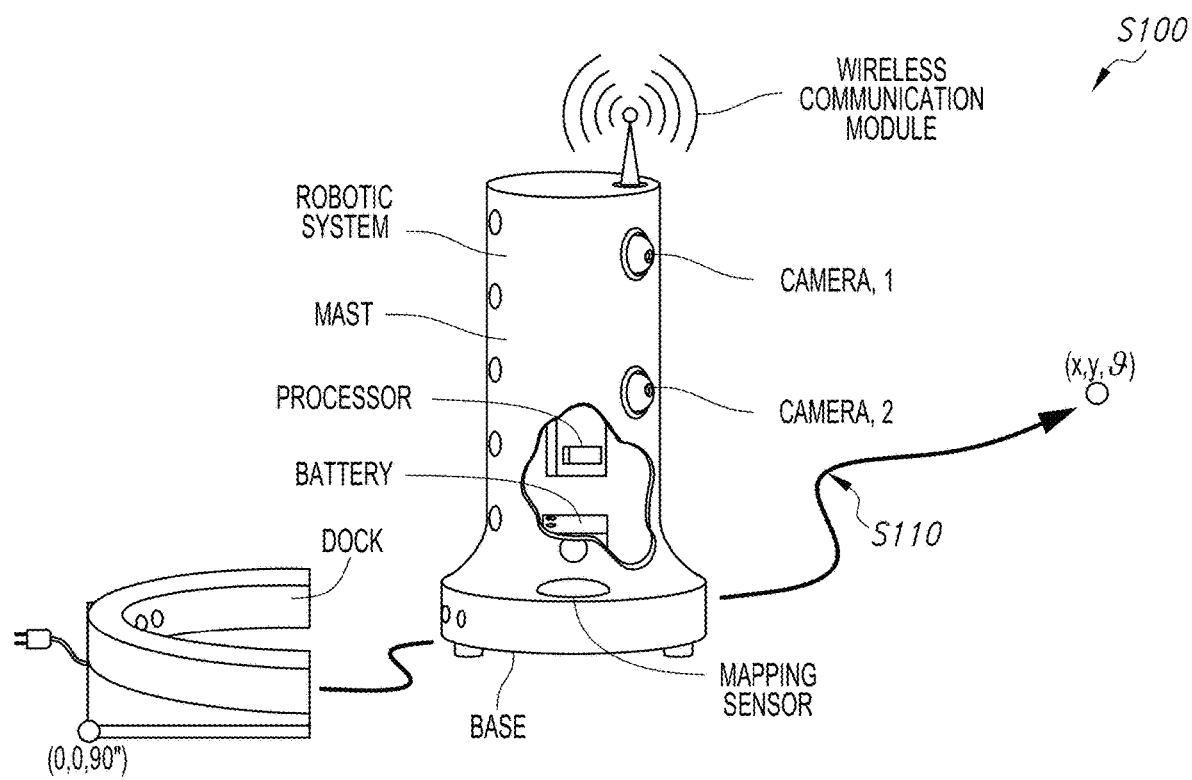
FIG. 2 is a schematic representation of a robotic system.

As shown in FIG. 2, a robotic system autonomously navigates throughout a store and records images—such as photographic images of packaged goods and/or depth images of inventory structures—continuously or at discrete predefined waypoints throughout the store during a scan cycle. Generally, the robotic system can define a network-enabled mobile robot configured to autonomously: traverse a store; capture photographic (e.g., color, black-and-white) and/or depth images of shelving structures, shelving segments, shelves, slots, or other inventory structures within the store; and upload those images to the computer system for analysis, as described below.

In one implementation shown in FIG. 2, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems configured to generate depth images); a processor that transforms data collected by the mapping sensors into two- or three-dimensional maps of a space around the robotic system; a mast extending vertically from the base; a set of photographic cameras arranged on the mast; and a wireless communication module that downloads waypoints and a master map of a store from a computer system (e.g., a remote server) and that uploads photographic images captured by the photographic camera and maps generated by the processor to the computer system, as shown in FIG. 2. In this implementation, the robotic system can include photographic cameras mounted to the mast, such as a first vertical array of (e.g., two, six) photographic cameras on a left side of the mast and a second vertical array of photographic cameras on the right side of the mast, as shown in FIG. 2. The robotic system can additionally or alternatively include articulable photographic cameras, such as: one photographic camera mounted to a first vertical scanning actuator on the left side of the mast; and one photographic camera mounted to a second vertical scanning actuator on the right side of the mast. The robotic system can also include a zoom lens, a wide-angle lens, or any other type of lens on each photographic camera. However, the robotic system can define any other form, can include any other quantity or combination of color, depth, infrared, or other optical sensors, and can autonomously navigate through a store according to any other navigation and mapping techniques.

Furthermore, multiple robotic systems can be deployed in a single store and can be configured to cooperate to image shelves and product units within the store. For example, two robotic systems can be deployed to a large single-floor retail store and can cooperate to collect images of all shelves and inventory structures in the store within a threshold period of time (e.g., within one hour). In another example, one robotic system is deployed on each floor of a multi-floor store, and each robotic system collects images of shelves and inventory structures on its corresponding floor. The computer system can then aggregate photographic and/or depth images captured by these robotic systems deployed in this store to generate a graph, map, table, and/or task list for managing distribution and restocking of product throughout the store.

Furthermore, the computer system is described herein as accessing images captured by the robotic system during a scan cycle. However, the computer system can additionally or alternatively access such images captured by fixed camera modules throughout the store. Additionally or alternatively, Blocks of the method S100 can be executed locally by the robotic system (or by fixed camera modules) rather than remotely by the computer system (e.g., a remote server, a computer network).

4. Hierarchy and Terms

A "store" is referred to herein as a (static or mobile) facility containing one or more inventory structures.

A "product" is referred to herein as a type of loose or packaged good associated with a particular product identifier (e.g., a SKU) and representing a particular class, type, and varietal. A "unit" or "product unit" is referred to herein as an instance of a product—such as one bottle of detergent, one box of cereal, or package of bottle water—associated with one SKU value.

A "product facing" is referred to herein as a side of a product designated for a slot.

A "slot" is referred to herein as a section (or a "bin") of a shelf on an "inventory structure" designated for storing and displaying product units of the product type (i.e., of the same SKU or CPU). An inventory structure can include a shelving segment, a shelving structure, or other product display containing one or more slots on one or more shelves.

A "planogram" is referred to herein as a plan or layout designating display and stocking of multiple product facings across multiple slots, such as: in a particular shelving segment; across a particular shelving structure; across multiple shelving structures within a particular aisle; across multiple aisles in the store; or throughout the entirety of the store. In particular, the planogram can specify a target product type, a target product placement, a target product quantity, a target product quality (e.g., ripeness, time to peak ripeness, maximum bruising), and/or a target product orientation for a fully-stocked slot for each slot represented in the planogram. For example, the planogram can define a graphical representation of an inventory structure in the store, including graphical representations of each slot in this inventory structure, each populated with a quantity of graphical representations of product type assigned to this slot equal to a quantity of product facings assigned to this slot. Alternatively, the planogram can record textual product placement for one or more inventory structures in the store in the form of a spreadsheet, slot index, or other database.

Furthermore, a "realogram" is referred to herein as a representation of the actual products, actual product placement, actual product quantity, and actual product orientation of products and product units throughout the store during a scan cycle, such as derived by the computer system according to Blocks of the method S100 based on photographic images and/or other data recorded by the robotic system while autonomously executing scan cycles in the store.

The method S100 is described herein as executed by a computer system (e.g., a remote server, a computer network) remote from the robotic system. However, Blocks of the method S100 can be executed locally by one or more robotic systems deployed in a retail space (or store, warehouse, etc.), by a local computer system (e.g., a local server), or by any other computer system.

Furthermore, Blocks of the method S100 are described below as executed by the computer system to identify products, shelf tags, and promotional tags on open shelves in shelving structures within a grocery store. However, the computer system can implement similar methods and techniques to identify products, shelf tags, and promotional tags on cubbies, in a refrigeration unit, on a wall rack, on a freestanding floor rack, on a table, on a hot-food display, or on or in any other product organizer, display, or other inventory structure in a retail space.

5. Robotic System Provisioning

Block S110 of the method S100 recites deploying the robotic system to autonomously navigate through the store during a mapping cycle. Generally, in Block S110, the remote computer system triggers the robotic system to autonomously navigate through the store, to generate a (2D or 3D) spatial map of the store, and to capture wireless connectivity data—georeferenced to this spatial map—throughout the store.

In one implementation, when the robotic system is first powered on in the store and/or once confirmed by a robotic system operator, the remote computer system serves a command to the robotic system to initiate a mapping routine in Block S110.

6. Mapping Cycle

Once triggered to execute a mapping cycle by the remote computer system in Block S110, the robotic system can move off of its dock and autonomously navigate through the store while recording distance data through its integrated mapping sensors and capturing wireless network connectivity data for one or more wireless networks before returning to its dock to conclude this mapping cycle.

6.1 Spatial Map

In one implementation, the robotic system implements simultaneous localization and mapping (or "SLAM") techniques to construct and update a (2D or 3D) spatial map of an unknown environment within the store while also tracking its location within this spatial map based on distance data collected via depth sensors in the robotic system throughout this mapping cycle. For example, a depth sensor in the robotic system can capture depth images representing distances to nearby physical surfaces, and the robotic system can compile these depth images into a spatial map of the store, such as in the form of a 2D or 3D point cloud representing locations of inventory structures, displays, and counters throughout the store. Alternatively, the robotic system can collect raw depth data during this mapping cycle and upload these data to the remote computer system, such as in real-time or upon conclusion of the mapping cycle. The remote computer system can then reconstruct a spatial map of the store from these raw depth data. However, the robotic system or the remote computer system can implement any other method or technique to generate a spatial map of the floor space within the store.

6.2 Wireless Connectivity Map

Figure 6:
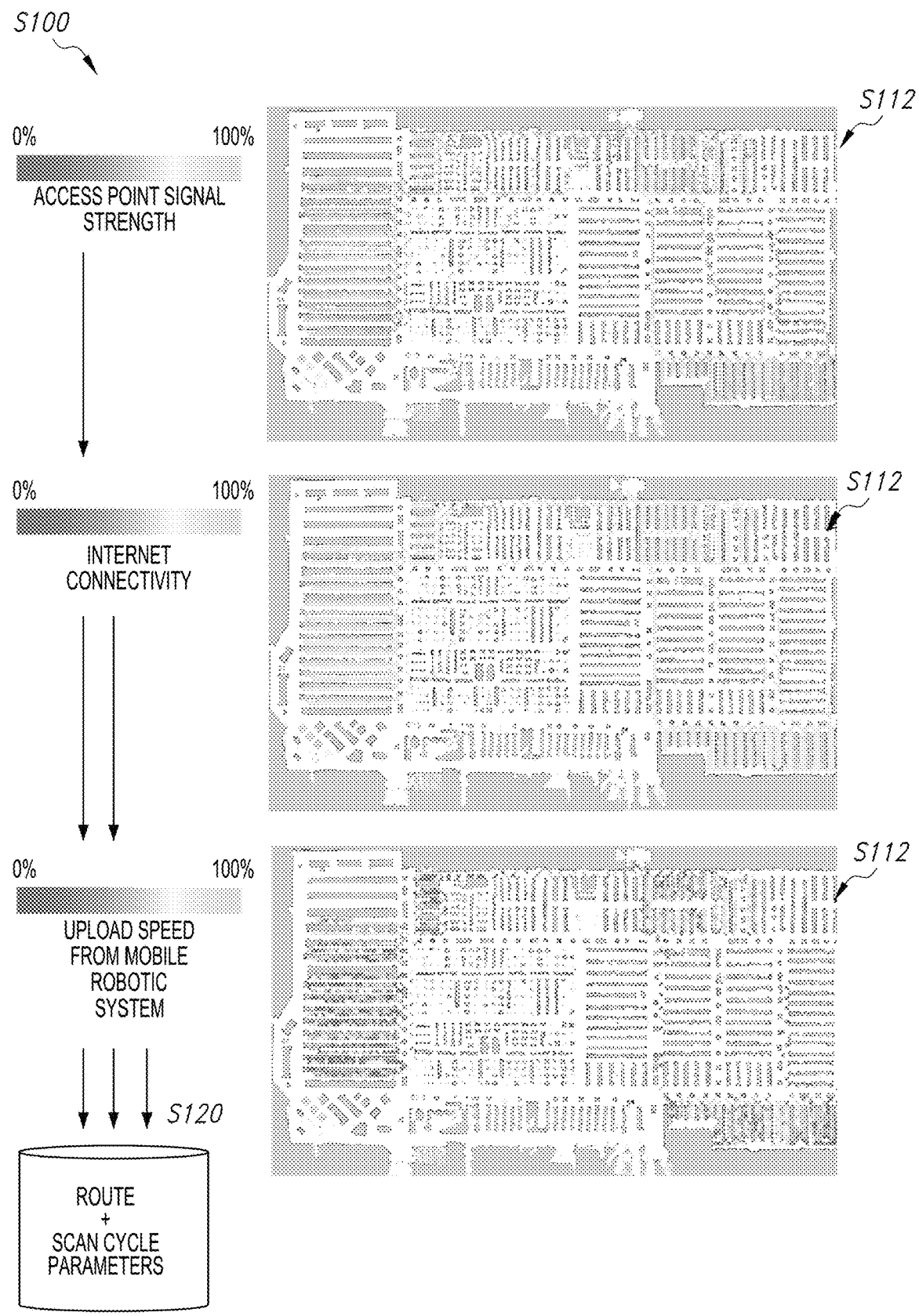
FIG. 6 is a flowchart representation of one variation of the method.

As the robotic system navigates through the store during this mapping cycle, the robotic system can also assess performance of one or more wireless networks within the store as a function of location of the robotic system, as shown in FIG. 6. For example, the robotic system can regularly execute a test routine on an available or selected wireless network (e.g., a wireless ad hoc local area network, a cellular network), such as by broadcasting a test signal via a corresponding network antenna in the robotic system at a frequency of once per second or once per meter traversed by the robotic system to test: latency, throughput, packet loss, signal strength; transmit/receive rates; bit rate; link quality; signal level; Internet connectivity, etc. for multiple frequencies and/or multiple channels. The robotic system can thus characterize latency, throughput, packet loss, signal quality, and/or signal strength, etc. of the wireless network over a sequence of discrete test locations occupied by the robotic system during the mapping cycle in the store. The robotic system can also detect and characterize channel switching, packet retries, and/or erroneous packets, etc. as a function of location within the store.

Furthermore, the robotic system can tag each group of wireless network characteristics captured by the robotic system during this mapping cycle with a geolocation of the robotic system during the corresponding wireless network test. The robotic system and/or the remote computer system can also aggregate these wireless network characteristics—each tagged with a geolocation referenced to the store—into a wireless connectivity map, such as in the form of a heatmap containing a visual representation of wireless connectivity characteristics at each test location and interpolated wireless connectivity characteristics between these test locations.

The robotic system can also execute the foregoing process (es) concurrently for each of multiple wireless networks accessible in the store, such as both a wireless ad hoc local area network and a cellular network.

6.3 Images

In one variation, the robotic system also captures images (e.g., 2D photographic images) and tags each image with the position and orientation of the robotic system—relative to the spatial map of the store—when captured by the robotic system. For example, the robotic system can capture images at a frequency of 10 Hz or once per 100 millimeters traversed by the robotic system. The robotic system can then transmit these images to the remote computer system or to a remote database in (near) real-time via one or more wireless networks during the mapping cycle. (The robotic system can also derive characteristics of these wireless networks based on success, speed, latency, etc. of images upload by the robotic system via these wireless networks.)

6.4 Manual Operation

In one variation, a robotic system operator manually navigates the robotic system through the store during the mapping cycle, such as via an operator portal accessed via a native application or within a web browser executing on the operator's computing device. For example, in this variation, the robotic system operator may send navigational commands and image capture commands to the robotic system. The robotic system can then execute these navigational commands and capture images according to these image capture commands while automatically generating spatial and wireless connectivity maps of the store, as described above.

However, the robotic system can generate a spatial map, generate a wireless connectivity map, and/or capture images of inventory structures throughout the store according to any other method or technique. Additionally or alternatively, the robotic system can capture these raw depth and wireless connectivity data, and the remote computer system can compile these data into spatial and wireless connectivity maps of the store.

7. Inventory Structure/Route Link

After accessing (or generating) the spatial map of the store thus derived from data captured by the robotic system during the mapping cycle, the remote computer system can interface with the robotic system operator, the store manager, and administrator, etc.: to define inventory structures (e.g., shelving structures, shelving segments, refrigerators, produce displays) represented by features in the spatial map; and to link each inventory structure representation in the spatial map to an inventory structure-specific planogram specifying types and facings of products assigned to each slot in these inventory structures. (Alternatively, the remote computer system can interface with the robotic system operator, the store manager, and administrator, etc. to link each inventory structure representation in the spatial map to a segment of a store-wide planogram that specifies types and facings of products assigned to slots throughout the store.)

Additionally or alternatively, the remote computer system can automatically compile the spatial map of the store with a planogram of the store and/or an architecture plan of the store in order to delineate inventory structures represented in the spatial map, such as described in U.S. patent application Ser. No. 15/600,556.

8. Imaging Parameters

The remote computer system can then interface with the robotic system operator to manually define imaging parameters for capturing images along inventory structures in the store, such as: a route along an inventory structure; robotic system offset distance from the shelf face of this inventory structure; image capture density along the inventory structure; and/or image offset along the inventory structure. Additionally or alternatively, the remote computer system can derive these imaging parameters automatically from the spatial map and/or the planogram of the store, such as described in U.S. patent application Ser. No. 15/600,556.

Additionally or alternatively, in the variation described above in which the robotic system captures images of inventory structures in the store during the mapping cycle, the robotic system can leverage these mapping cycle images to calculate minimum or target densities of images for the robotic system to capture during future scan cycles of the store—in order to enable derivation of stock conditions of the store with a high degree of accuracy from images captured during these scan cycles.

In one implementation, the robotic system aggregates groups of images captured by the robotic system while traversing individual inventory structures in the store. For a first group of images captured along—and therefore depicting—a first inventory structure, the remote computer system then: stitches images in this first group into a first composite image depicting the first inventory structure; assesses qualities of this first composite image; and then calculates a density of images along the first inventory structure that may yield sufficient data to derive an accurate stock condition of the first inventory structure. For example, if the target image resolution of a segment of the first composite image is less than a target resolution (e.g., that enables detection and resolve or barcodes on shelf tags), the remote computer system can specify capture of a higher density of images by the robotic system while traversing the corresponding segment of the first inventory structure during a future scan cycle and/or specify navigation of the robotic system closer to this segment of the first inventory structure; and vice versa. In a similar example, if the overlap of adjacent images that form the first composite image is less than a target image overlap (e.g., to enable alignment and flattening of these images into a high-resolution composite image), the remote computer system can specify capture of a higher density of images by the robotic system while traversing a corresponding segment of the first inventory structure during a future scan cycle and/or specify navigation of the robotic system closer to this segment of the first inventory structure; and vice versa.

Therefore, the remote computer system can leverage images captured by the remote computer system during the mapping cycle to set imaging parameters for a future scan of the first inventory structure in order to achieve a target resolution and a minimum accuracy of a composite image of the first inventory structure thus generated from images captured by the robotic system.

The remote computer system can implement similar methods and techniques to calculate imaging parameters for other inventory structures throughout the store.

9. Wireless Network Connectivity Per Inventory Structure

The remote computer system can then estimate upload durations for images captured during a future scan cycle based on wireless connectivity—represented in the wireless connectivity map—throughout the store and image capture density specified throughout the store.

In one implementation, the remote computer system segments the store by inventory structure and estimates a time to upload images captured along an inventory structure based on specified image capture density along this inventory structure, predicted image size, and wireless connectivity along this inventory structure. For example, for a first inventory structure in the store, the remote computer system can: calculate a quantity of images scheduled for capture along the first inventory structure based on the image capture density assigned to the first inventory structure and a length of the first inventory structure; estimate a size of images captured along this first inventory structure (e.g., based on a resolution of cameras integrated into the robotic system); estimate a total image package size based on the quantity and sizes of images designated for capture along the first inventory structure; query the wireless connectivity map for wireless connectivity (e.g., wireless signal strength, bandwidth) along or near the first inventory structure; and estimate a total time to transmit the images scheduled for the first inventory structure based on wireless connectivity near this first inventory structure, capture time for these images, and total image package size for the first inventory structure.

(Alternatively, the remote computer system can segment the store by shelving structure, shelving segment, aisle, or department, etc. and can implement similar methods and techniques to estimate total transmit times for images captures in such areas of the store.)

10. Scanning Parameters and Data Upload Modifications Per Inventory Structure The remote computer system can then modify the traversal speed designated along the inventory structures (or shelving structures, shelving segments, aisles, or departments, etc. in the store) and define data upload schedules for individual inventory structures throughout the store based on inventory structure traversal and image upload duration estimates.

10.1 Traversal duration Exceeds Upload Duration

In one implementation, the remote computer system estimates a time to traverse the first inventory structure and to capture images along the first inventory structure based on a length of the first inventory structure and a nominal traversal speed of the robotic system when operating autonomously in the store. Then, if the estimated image upload duration for images captured along the first inventory structure is less than this first estimated traversal duration for the first inventory structure, the remote computer system can schedule the robotic system: to traverse the first inventory structure after a second inventory structure with a second estimated traversal duration that is less than a second data estimated data upload duration; and to upload images—previously captured by the robotic system while traversing the second inventory structure and stored in a local buffer—to the remote database via the wireless network while traversing the first inventory structure.

10.2 Upload Duration Exceeds Traversal Duration

Conversely, if the estimated image upload duration for the first inventory structure is more than the first estimated traversal duration for the first inventory structure, the remote computer system can: scan the spatial map and the wireless connectivity map for a second inventory structure nearby for which a second traversal duration exceeds a second image upload duration; schedule the robotic system to scan the first inventory structure before the second inventory structure; and to upload images—captured by the robotic system while traversing the second inventory structure and stored in local memory—to the remote database via the wireless network while traversing the second inventory structure.

Additionally or alternatively, if the estimated image upload duration for the first inventory structure is more than the first estimated traversal duration for the first inventory structure, the remote computer system can: reduce the traversal speed assigned to the first inventory structure in order to align the traversal duration of the first inventory structure to the image upload duration for images captured by the robotic system while traversing the first inventory structure.

In yet another implementation, if the estimated image upload duration for the first inventory structure is more than the first estimated traversal duration for the first inventory structure, the remote computer system can: schedule the robotic system to store images—captured along the first inventory structure—in a local buffer; scan the wireless connectivity map for a particular location exhibiting increased wireless connectivity; append a planned route along the first inventory structure with a data upload waypoint at the particular location; and schedule the robotic system to stop at this waypoint and upload images from the buffer before navigating to and traversing a next inventory structure. In this implementation, the remote computer system can also: estimate a proportion of the images captured by the robotic system while traversing the first inventory structure that the robotic system may successfully upload to the remote database via the wireless network before reaching this waypoint based on wireless connectivity between the first inventory structure and the waypoint; estimate a pause time for the robotic system to upload the remainder of these images from the local buffer to the remote database via the wireless network while occupying this waypoint; and add this pause time to estimated traversal duration for the first inventory structure.

The remote computer system can implement the foregoing methods and techniques for each other inventory structure (or shelving structure, shelving segment, aisle, or department, etc.) in the store.

11. Dead Zone

In another implementation, the remote computer system scans the wireless connectivity map for wireless network "dead zones" in which little or no wireless network connectivity is available.

In response to detecting a dead zone, the remote computer system further scans the wireless connectivity map for wireless access region(s)—around this dead zone—in which wireless connectivity exceeds a minimum quantity that enables the robotic system to transmit at least baseline "heartbeat data" to the remote database. The remote computer system can then estimate a maximum traversal distance that the robotic system may travel from this wireless access region(s) into the dead zone before reversing back into the wireless access region(s) within a maximum blackout duration. For example, for a maximum blackout duration of three minutes and a nominal operating speed of 0.2 meters per second, the robotic system may traverse the dead zone for up to 90 seconds—or up to 18 meters into the dead zone—before returning to the wireless access region (or to another wireless access region nearby). Accordingly, the remote computer system can calculate a boundary offset from the wireless access region(s) into the dead zone by this maximum traversal distance, including accounting for static obstacles such as inventory structure. More specifically, the remote computer system can calculate an accessible ground area within the dead zone that is accessible by the robotic system within the maximum blackout duration in light of physical obstacles in and around the dead zone. Then, if any segment of the dead zone falls outside of this accessible ground area, the remote computer system can: flag this segment of the dead zone as inaccessible to the robotic system in light of current wireless network connectivity in this region of the store; and remove this segment of the dead zone from an area of the store scheduled for scanning by the robotic system. In this implementation, the remote computer system can also prompt the robotic system operator, store manager, or administrator, etc. to either: install an additional wireless network access point in or near this segment of the store in order to enable the remote controller to image inventory structures in this segment of the dead zone; or confirm withdrawal of this segment of the dead zone from tracking by the robotic system and remote computer system.

Otherwise, for the accessible ground area thus calculated within the dead zone, the remote computer system can schedule the robotic system to: autonomously navigate within a first segment of this region and capture a first set of images of a first subset of inventory structures (or a first subset of slots) in this dead zone; return to a nearest wireless access region before expiration of the maximum blackout duration; and then broadcast a first heartbeat signal and/or upload this first set of images to the remote database. If a second inventory structure is located within this accessible ground area, the remote computer system can further schedule the robotic system to: return to a second segment of this region and capture a second set of images of a second subset of inventory structures (or a second subset of slots) in this this dead zone; return to a nearest wireless access region before expiration of the maximum blackout duration; and then broadcast a second heartbeat signal and/or upload this second set of images to the remote database. In this implementation, the remote computer system can further estimate a total time for the robotic system to complete this process—including uploading these images to the remote database—and store this time as an estimated traversal and upload duration for inventory structures in this region of the store.

12. Storewide Route

The remote computer system can therefore execute the foregoing methods and techniques to estimate traversal and image upload durations for inventory structures throughout the store, including both inventory structures in regions of the store with sufficient wireless connectivity and inventory structures in wireless network dead zones throughout the store.

The remote computer system can then calculate a route through the store and along each of these inventory structures. For example, the remote computer system can implement a weighting function to order inventory structures for scanning during a future scan cycle according to: proximity of these inventory structures to a robotic system dock; proximity of inventory structures to other inventory structure; and image upload durations versus traversal durations for these inventory structures. In this example, the remote computer system can then: calculate route connections between previously-defined routes along these inventory structures according to the order thus calculated for these inventory structures; and compile these inventory structure-specific routes and connections therebetween into one continuous route for the store.

13. Route Metrics

The remote computer system can also estimate a total duration of time for the robotic system to traverse the continuous route at traversal speeds assigned to each of these inventory structures, including pause periods and re-docking periods to upload images from local memory to the remote database with the wireless network. The remote computer system can then calculate an efficiency ratio for this route, such as as a function of total area of the store imaged along this route divided by the total estimated duration of this scan cycle. The remote computer system can also: estimate a maximum duration of non-connectivity periods when the robotic system traverses this route during a scan cycle; calculate a proportion (e.g., percentage) of inventory structures (e.g., slots) in the store imaged by the robotic system during this scan cycle; and/or estimate a time from start of the route to receipt of all images—from this scan cycle—at the remote database.

Furthermore, the remote computer system can estimate a time to process and transform all images from this scan cycle into a realogram of the store, such as: based on a predicted latency between capture of each image scheduled along this route and transmission of this image over the wireless network given hyper-local wireless network connectivity in the store represented in the wireless connectivity map; and in light of a number machines available or queued to process these images. Based on an estimated time from the start of the scan cycle to completion of a realogram of the store according to features extracted from images captured by the robotic system when traversing this route, the remote computer system can also calculate a latency value for the scan cycle, which represents: a time that a store manager and store associates must wait to receive a global restocking list for the store after start of a scan cycle; and thus a minimum duration of time at which to schedule an instance of this scan cycle prior to a scheduled restocking period in the store.

However, the remote computer system can calculate any other metrics or characterizations of the route thus calculated for the store.

14. Report and Deployment Confirmation

The remote computer system can then generate a report for this route and planned scan cycle, including: the total estimated duration of a scan cycle along this calculated route; the efficiency ratio of this scan cycle; the quantity and durations of non-connectivity periods during scan this cycle; the proportion of inventory structures in the store imaged by the robotic system during this scan cycle; and/or the latency value for this scan cycle; etc.

The remote computer system can also serve this report to the robotic system operator, store manager, and/or administrator, etc.—such as via a portal within a native application or web browser executing on a computing device—and prompt the robotic system operator, store manager, etc. to confirm deployment of the robotic system to the store in light of these scan cycle metrics. Additionally or alternatively, the remote computer system can selectively recommend that the robotic system operator or the store manager, etc. reject deployment of the robotic system to the store if any of these metrics deviates from a permissible range set for this metric.

15. Annotated Wireless Connectivity Map

The remote computer system can also: highlight or otherwise annotate regions of the wireless connectivity map characterized by no wireless connectivity, low wireless connectivity, and/or wireless connectivity (substantially) less than an average wireless connectivity throughout the store; and label each of these highlighted regions with a prompt to install a wireless network access point in a corresponding region of the store. Furthermore, for each of these highlighted regions, the remote computer system can: predict an increase in wireless connectivity in the store following installation of a wireless network access point in or near the corresponding region of the store; repeat methods and techniques described above to calculate a revised route through the store based on this predicted increase in wireless connectivity in this region of the store; and implement methods and techniques described above to recalculate metrics related to this route, such as including total duration of a scan cycle executed by the robotic system according to this revised route, an efficiency ratio of this scan cycle, a quantity and duration of non-connectivity periods during scan cycle, a proportion of inventory structures imaged by the robotic system during this scan cycle, and/or a latency value for the scan cycle. In this implementation, for each of these highlighted regions in the wireless connectivity map, the remote computer system can also calculate an access point value score for installation of a wireless network access point in this region of the store based on improvement of these scan cycle metrics—enabled by installation of wireless network access point in this region of the store—over current wireless connectivity in store.

The remote computer system can repeat: this process for each other null- and low-connectivity region highlighted regions in the wireless connectivity map; annotate these null- and low-connectivity regions in the wireless connectivity map with their corresponding access point value scores; and serve this annotated wireless connectivity map to the robotic system operator or store manager, etc. (e.g., via a store manager portal accessed through a native application or web browser executing on a local computing device). The robotic system operator and/or store manager may then review this annotated wireless connectivity map to support decisions related to deployment of the robotic system to the store and provisioning of additional wireless network access points in targeted locations within the store.

Additionally or alternatively, the remote computer system can rank these null- and low-connectivity regions based on their access point value scores (i.e., based on predicted magnitude of improvement in scan cycle metrics with installation of new wireless network access points in corresponding regions of the store); and serve recommendations to the robotic system operator and/or to the store manager, etc. to install additional wireless network access points in targeted regions of the store prioritized by access point value scores.

16. Scan Cycle

Later, following confirmation of deployment of the robotic system to this store, the remote computer system can schedule the robotic system to execute a scan cycle according to the route and imaging parameters thus calculated for the store.

Accordingly, the robotic system can autonomously execute this scan cycle, including: navigating off of its dock; navigating along inventory structures along the route and at speeds less than or equal to the traversal speeds set for these inventory structures; capturing images of inventory structures according to imaging parameters assigned to these inventory structures; pausing at scheduled image upload waypoints; uploading captured images to the remote database via the wireless network while traversing inventory structures and/or holding at scheduled image upload waypoints; generating a new spatial map representing physical objects throughout the store during this scan cycle; and returning to its dock to complete the scan cycle.

For example, the robotic system can implement methods and techniques described in U.S. patent application Ser. No. 15/600,527 to navigate autonomously throughout the store, to capture images of inventory structures throughout the store, and to upload these images to the remote database.

16.1 Wireless Connectivity Monitoring

During this scan cycle, the robotic system can also implement methods and techniques described above to test qualities of the wireless network. The robotic system or the remote computer system can then compile these wireless connectivity data into a new wireless connectivity map for the wireless network, such as described above.

Furthermore, the remote computer system can compare qualities of the wireless network during this scan cycle to qualities of the wireless network during the mapping cycle (or during a previous scan cycle in the store) to predict deviations from planned outcomes of the scan cycle. For example, the remote computer system can implement methods and techniques described above to estimate scan cycle metrics for the current scan cycle based on current wireless connectivity in the store, such as including: a remaining time to completion of the scan cycle; a remaining time to generation of a realogram based on data captured during this scan cycle; and a difference between a baseline duration and predicted duration of this scan cycle based on wireless connectivity in the store during the mapping cycle and detected during this scan cycle, respectively. For example, the remote computer system can predict a longer scan cycle if wireless connectivity has worsened in a region of the store relative to wireless connectivity detected in this region during the mapping cycle, and vice versa.

The remote computer system can then return these metrics to a store manager portal or robotic system operator portal, such as described above.

16.2 Wireless Connectivity Error

In another variation, if the robotic system loses connection to the wireless network during the scan cycle, the robotic system can set a timer for a maximum out-of-network time (e.g., five minutes) and continue navigating along its planned route. If the robotic system reconnects to the wireless network before conclusion of the timer, the robotic system can clear the timer. However, if the timer expires before the robotic system reestablished connection to the wireless network, the robotic system can cancel the scan cycle before completion and autonomously navigate back to the dock.

In this implementation, if the robotic system canceled the scan cycle, the remote computer system can implement methods and techniques described above to highlight this connectivity loss region of the store in the new wireless connectivity map generated during this scan cycle. The remote computer system can then return this annotated wireless connectivity map to the store manager or robotic system operator with a notification that the scan cycle was canceled before completion due to wireless network failure in the highlighted region. The remote computer system can additionally or alternatively prompt the store manager or robotic system operator to repair or verify wireless connectivity in the store prior to a next scan cycle by the robotic system.

16.3 Route Revisions

In another variation, following conclusion of the scan cycle, the remote computer system can implement methods and techniques described above to calculate a new route and other scan cycle parameters (e.g., image capture parameters, image offload parameters) for next scan cycle based on wireless connectivity represented in the new wireless connectivity map generated based on data collected the robotic system during this scan cycle.

In one example, the remote computer system: retrieves the new and past wireless connectivity maps for the store; assigns weights to each of these wireless connectivity maps inversely proportional to age; and spatially aligns and combines these wireless connectivity maps according to their weights to generate a composite wireless connectivity map for the store. In this example, the remote computer system can: then implement methods and techniques described above to calculate a new route and other scan cycle parameters for the next scan cycle based on wireless connectivity represented in this composite wireless connectivity map; and queue the robotic system to execute this route and scan cycle parameters during a next scan cycle.

Additionally or alternatively, the computer system can implement similar methods and techniques to revise the route and other scan cycle parameters in (near) real-time as the robotic system executes a scan cycle, offloads images to the remote database via the wireless network, and capture wireless connectivity data for the store.

17. Routing and Scheduling by Traversal and Upload Durations

Figure 3A:
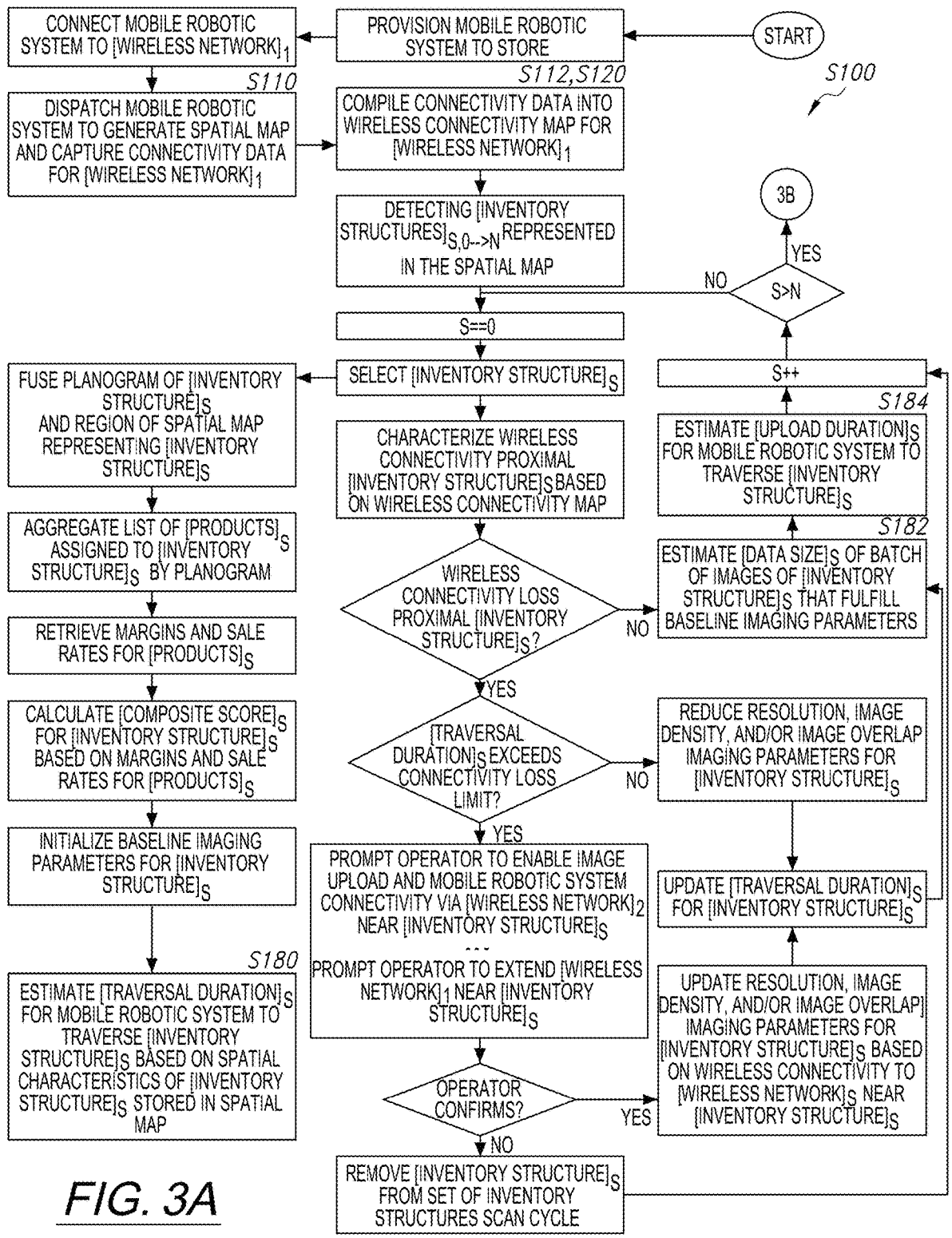
FIGS. 3A, 3B, and 3C are flowchart representations of one variation of the method.
Figure 3B:
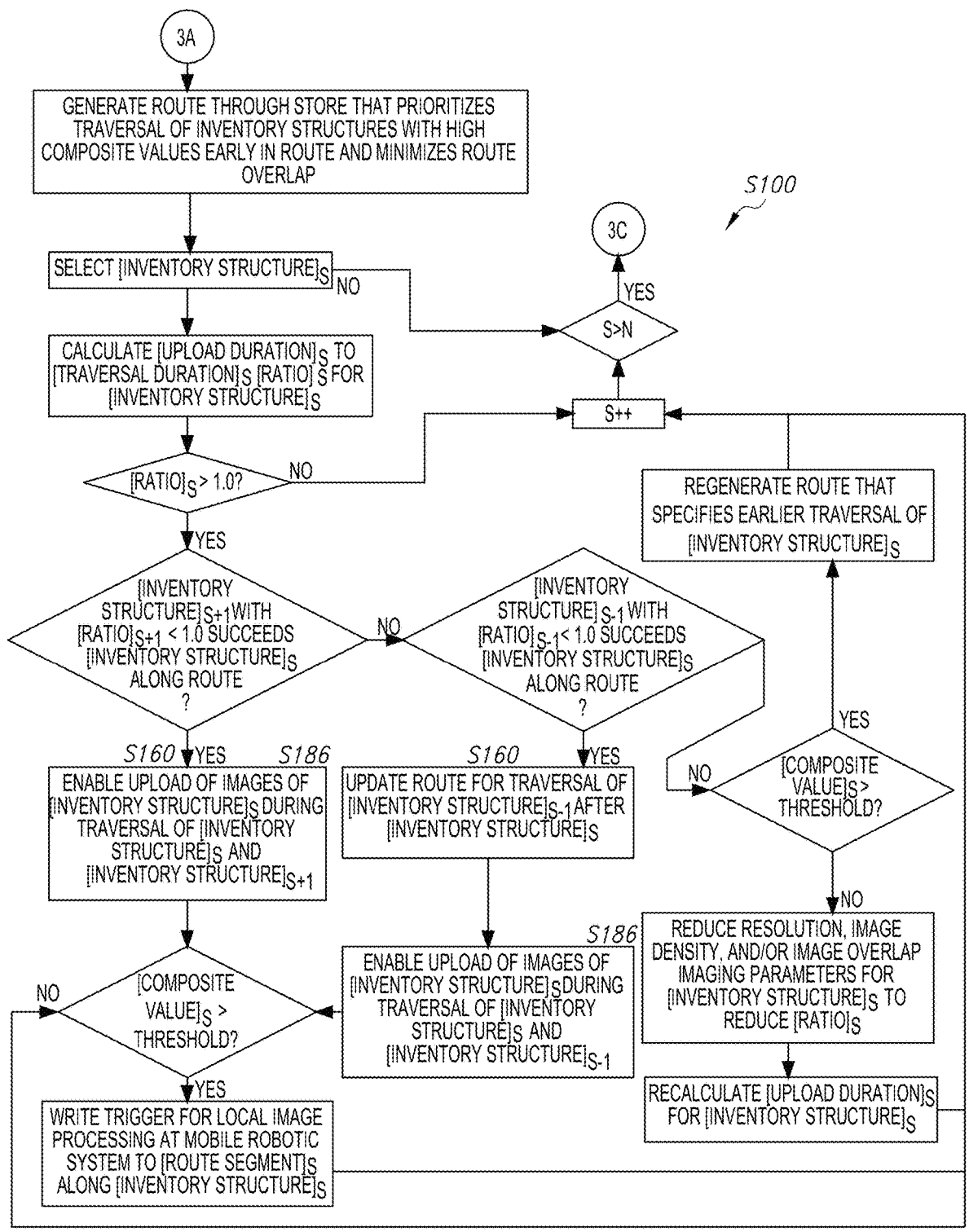
Figure 3C:
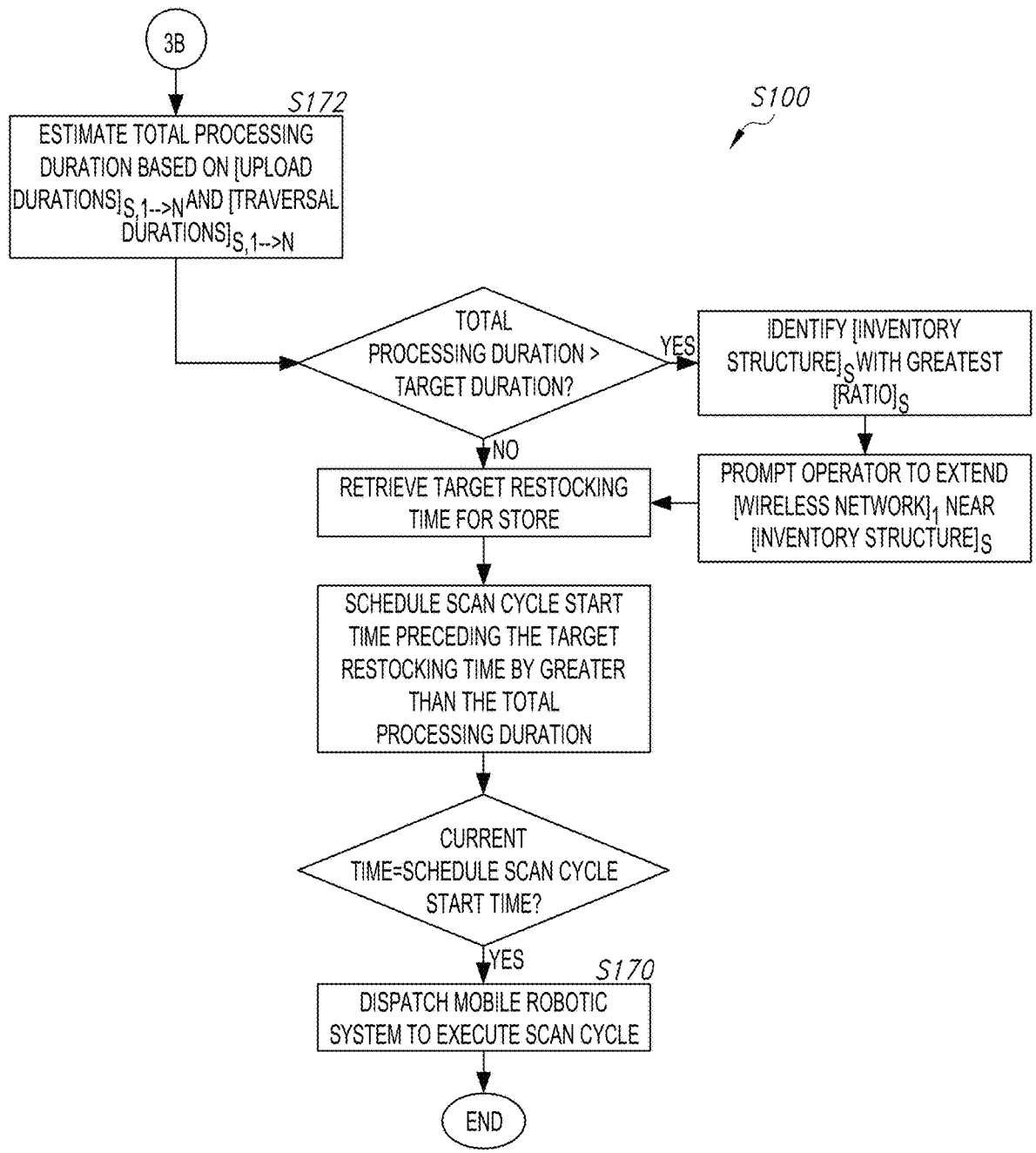

One variation of the method S100 shown in FIGS. 3A-3C includes: dispatching the mobile robotic system to navigate along a set of inventory structures within the store during a mapping cycle in Block S110; at the mobile robotic system, while navigating along the set of inventory structures during the mapping cycle, capturing a set of wireless connectivity metrics representing connectivity to a first wireless network in Block S112; and assembling the set of wireless connectivity metrics into a wireless connectivity map of the store in Block S120. This variation of the method S100 also includes, for a first inventory structure in the set of inventory structures: estimating a first traversal duration for the mobile robotic system to traverse the first inventory structure and capture a first set of images that depict product units occupying the first inventory structure within a target resolution range in Block S180; estimating a first data size of the first set of images in Block S182; and estimating a first upload duration for the mobile robotic system to upload the first set of images to a remote computer system via the first wireless network based on the first data size and the wireless connectivity map in Block S184. Similarly, this variation of the method S100 includes, for a second inventory structure in the set of inventory structures: estimating a second traversal duration for the mobile robotic system to traverse the second inventory structure and capture a second set of images that depict product units occupying the second inventory structure within the target resolution range in Block S180; estimating a second data size of the second set of images in Block S182; and estimating a second upload duration for the mobile robotic system to upload the second set of images to the remote computer system via the first wireless network based on the second data size and the wireless connectivity map in Block S184. This variation of the method S100 further includes: dispatching the mobile robotic system to autonomously capture images of the set of inventory structures within the store during a scan cycle succeeding the mapping cycle in Block S170; and, in response to the first upload duration exceeding the first traversal duration and in response to the second traversal duration exceeding the second upload duration, scheduling upload of a subset of the first set of images from the mobile robotic system to the remote computer system during traversal of the second inventory structure by the mobile robotic system during the scan cycle in Block S186.

A similar variation of the method S100 includes: dispatching the mobile robotic system to navigate along a set of inventory structures within the store during a setup cycle in Block S110; at the mobile robotic system, while navigating along the set of inventory structures during the setup cycle, capturing a set of wireless connectivity metrics representing connectivity to a first wireless network in Block S112; and assembling the set of wireless connectivity metrics into a wireless connectivity map of the store in Block S120. This variation of the method S100 also includes, for each inventory structure in the set of inventory structures: estimating a data size of a set of photographic images of the inventory structure, captured by the mobile robotic system, that depict product units occupying the inventory structure at greater than a minimum resolution in Block S182; and estimating an upload duration, in a set of upload durations, for the mobile robotic system to upload the set of photographic images to a remote computer system via the first wireless network based on the data size and the wireless connectivity map in Block S184. This variation of the method S100 further includes: estimating a processing duration from initiation to transform photographic images of inventory structures in the store, captured by the mobile robotic system, into a stock condition of the store based on the set of upload durations in Block S172; and dispatching the mobile robotic system to autonomously capture images of the set of inventory structures within the store during a scan cycle preceding a scheduled restocking period in the store based on the processing duration in Block S110.

17.1 Data Fusion

Generally, in this variation, the remote computer system can dispatch the mobile robotic system to navigate through the store—such as autonomously or via remote manual control—during a mapping cycle to generate a spatial map of inventory structures and other objects throughout the store and to generate a wireless connectivity map representing performance of a wireless network (e.g., a local area network) through the store.

The remote computer system can then: fuse this spatial map with planograms of inventory structures in the store to estimate 3D locations of slots, shelf tags, and product units throughout the store; and estimate imaging requirements (e.g., image size, image resolution, consecutive image overlap) to capture visual data of each slot, shelf tag, and/or product unit with a minimum resolution and redundancy to enable accurate and repeatable transformation of these visual data into a stock condition of many (e.g., most, all) slots in the store. Then, for each inventory structure, the remote computer system can: calculate a target offset distance from the mobile robotic system to the inventory structure to achieve a minimum imaging resolution of product units occupying the inventory structure based on a height of the inventory structure and resolution characteristics of optical sensors in the mobile robotic system; estimate a quantity and sizes of images captured by the mobile robotic system while traversing this inventory structure at this target offset distance to achieve the minimum imaging resolution and a minimum overlap between consecutive images; estimate a duration of time for the mobile robotic system to traverse and image the inventory structure based on (e.g., proportional to) a length of the inventory structure and the quantity of images; and estimate a duration of time for the mobile robotic system to upload these images to the remote computer system (or to a remote database) based on characteristics of the wireless network along and near the inventory structure, as represented in the wireless connectivity map.

Therefore, the remote computer system can fuse planograms of the inventory structures in the store, a spatial map of the store, and a wireless connectivity map for a (primary) wireless network in the store to: define imaging parameters that enable accurate and repeatable interpretation of stock conditions of slots on inventory structures throughout the store; estimate durations of time for the mobile robotic system to traverse and image each inventory structure during a scan cycle; and estimate durations of time for the mobile robotic system to upload (or "stream") images of these inventory structures back to the remote computer system (or the remote database) in real-time during this scan cycle.

17.2 Inventory Structure Imaging Order

In this variation, the remote computer system can then define an order for traversing inventory structures in the store during a scan cycle based on these estimated values. In particular, the remote computer system can: prioritize imaging of inventory structures with poor local connectivity and/or upload durations in excess of their traversal durations near the beginning of a scan cycle; and weight imaging of inventory structures with high wireless connectivity and/or associated with traversal durations in excess of their upload durations toward the end of the scan cycle, such as shown in FIG. 3B.

For example, the remote computer system can calculate a ratio of upload duration to traversal duration for each inventory structure. The remote computer system can then calculate a route through the store that: weights imaging of inventory structures with high ratios toward the beginning of the route; weights imaging of inventory structure with low ratios toward the end of the route; minimizes penalties for overlapping route sections; and/or produces the shortest total route length from a docking location in the store, through the store, and back to the docking location, as shown in FIG. 3B.

Accordingly, the remote computer system can also explicitly schedule upload of a batch of images—captured by the mobile robotic system during a scan cycle while traversing a first inventory structure characterized by a high upload to traversal duration ratio (i.e., greater than 1.0)—to the remote computer system while the mobile robotic system is subsequently traversing and capturing images of a second inventory structure characterized by a low upload to traversal duration ratio (i.e., less than 1.0). Therefore, in this example, the remote computer system and/or the mobile robotic system can: schedule traversal and imaging of a first inventory structure by the mobile robotic computer system prior to traversal and imaging of a second inventory structure by the mobile robotic computer system during a scan cycle in Block S160; and schedule upload of a subset of a first set of images of the first inventory structure from the mobile robotic system to the remote computer system during traversal of the second inventory structure by the mobile robotic system during the scan cycle in Block S186 in response to a first upload duration for the first set of images exceeding a first traversal duration for the first inventory structure and in response to a second traversal duration for the second inventory structure exceeding a second upload duration for a second set of images of the second inventory structure.

Alternatively, the mobile robotic system can upload images to the remote computer system in order of capture time (e.g., timestamp) during the scan cycle, thereby implicitly implementing a similar schedule.

Thus, when the mobile robotic system traverses the planned route during a scan cycle, the mobile robotic system can: capture images of a first inventory structure characterized by a high upload to traversal duration ratio; upload a first subset of these images to the remote computer system via the wireless network in real-time while traversing this first inventory structure; store a second subset of these images in local memory while continuing along the planned route; and upload a second subset of these images while traversing a next inventory structure, such as characterized by a lower upload to traversal duration ratio. As the mobile robotic system reaches inventory structures characterized by successively lower upload to traversal duration ratios, the mobile robotic system can upload images stored in local memory at faster rates and thus "catch up" the current completion rate of image offload to the current completion rate of the route. More specifically, by prioritizing traversal and imaging of inventory structures characterized by higher upload to traversal duration ratio at the beginning of the scan cycle, the mobile robotic system and the remote computer system can: better avoid instances of incomplete utilization of wireless network bandwidth throughout the store; shorten or eliminate a delay from completion of the route to complete offload of images from the mobile robotic system to the remote computer system; and minimize a processing duration from start of the scan cycle to calculation of a complete stock condition for the store.

17.3 Processing Duration and Scan Cycle Scheduling

In this variation, the remote computer system can additionally or alternatively estimate a processing duration—from start of the scan cycle to transformation of photographic images of inventory structures in the store, captured by the mobile robotic system during the scan cycle, into a stock condition of the store—based on upload durations and/or traversal durations thus calculated for inventory structures throughout the store in Block S172, as shown in FIG. 3C.

For example, the computer system can: implement methods and techniques described above to: generate a route for the mobile robotic system to traverse through the store during the scan cycle; estimate a traversal speed of the mobile robotic system for each inventory structure based on image quantity, image capture frequency, image stabilization, and/or other imaging parameters assigned to each inventory structure; and simulate traversal of the route by the mobile robotic system based on these traversal speeds. The remote computer system can also: simulate image capture locations along the route based on these imaging parameters; estimate quantities and data sizes of these images; and simulate times throughout a scan cycle that the remote computer system receives images from the mobile robotic system based on the wireless connectivity represented in the wireless connectivity map, simulated captured locations for these images, and sizes of these images.

The remote computer system can then: estimate a duration of time to interpret a stock condition in a section of an inventory structure depicted in each image based on sizes of these image, quantities of slots in these inventory structure sections, and computational resources available to process these images; and estimate the total processing duration for the scan cycle based on these estimated processing durations for individual images and the simulated times throughout the scan cycle that the remote computer system is predicted to receive images from the mobile robotic system.

The remote computer system can then publish the total processing duration for the scan cycle for review, such as by the store manager via the manager portal. Then, if the manager desires a shorter total processing duration, the remote computer system can prompt the manager (or the operator, etc.): to enable access to a second wireless network in the store in order to increase the image offload rate from the mobile robotic system to the remote computer system; contract more computational resources to process these images; and/or remove a section of the store scheduled for imaging and traversal by the mobile robotic system during the scan cycle in order to reduce the processing duration, such as described below.

Additionally or alternatively, in this implementation, the remote computer system can: access a scheduled restocking period in the store (e.g., 11 PM on weeknights); and calculate a scan cycle start time that precedes the scheduled restocking period by greater than the processing duration, as shown in FIG. 3C. For example, for an estimated 141- minute-long total processing duration, the remote computer system can set a 9 PM scan cycle start time (i.e., a start time for autonomous execution of a scan cycle by the mobile robotic system), thus yielding a 19-minute-long margin of safety to complete the processing duration prior to the 11 PM scheduled restocking period. The remote computer system can then trigger the mobile robotic system to initiate a next scan cycle at this scan cycle start time.

17.4 Wireless Network Changes

Thus, in the foregoing variation, the remote computer system can: estimate an upload duration for the mobile robotic system to upload a first set of images to the remote computer system via the wireless network in real-time while navigating along a first inventory structure based on a data size of the first set of images, a location of the first inventory structure within the store, and the wireless connectivity map; and repeat this process for each other inventory structure in the store. The remote computer system can then estimate a processing duration from start of the scan cycle to transformation of images of the set of inventory structures, captured by the mobile robotic system during the scan cycle, into a stock condition of the store based on the set of upload durations.

Then, if this processing duration exceeds a target duration, such as specified by the store manager or operator, the remote computer system can: identify a particular upload duration—in this set of upload durations—representing a greatest upload duration in the set of upload durations and corresponding to a particular inventory structure in the set of inventory structures in the store; generate a recommendation to install a wireless device proximal the particular inventory structure to extend wireless connectivity proximal the particular inventory structure and reduce the particular upload duration; and return this recommendation to the store manager or operator, as shown in FIG. 3C.

Additionally or alternatively, the remote computer system can: generate a recommendation to enable upload of images from the mobile robotic system to the remote computer system via a second wireless network during traversal of the particular inventory structure by the mobile robotic system during the scan cycle; and return this recommendation to the store manager or operator. Later, in response to confirmation of access to the second wireless network by the mobile robotic system, the remote computer system (or the mobile robotic system) can schedule upload of images—captured by the mobile robotic system during traversal of the particular inventory structure—to the remote computer system via the second wireless network during the scan cycle, thereby reducing the upload duration for the particular inventory structure and reducing the total processing duration for the scan cycle.

The remote computer system can therefore guide the store manager or operator toward making targeted improvements in wireless connectivity in the store in order to reduce the processing duration from start of a scan cycle to generation of actionable stock condition data for the store.

17.5 Local Image Processing

Additionally or alternatively, the remote computer system (or the mobile robotic system) can: schedule local processing of a first subset (or "batch") of images by the mobile robotic system in real-time during the scan cycle; and coordinate upload of both stock condition data derived from the first subset of images and other images captured by the mobile robotic system during the scan cycle and in order to reduce total size of data uploaded from the mobile robotic system via the wireless network, distribute processing of these images between the mobile robotic system and the remote computer system, and reduce the total processing duration for the scan cycle, as shown in FIG. 3B. More specially, the remote computer system can schedule local processing of an image captured in a region of the store characterized by low wireless network connectivity, such as low bandwidth, as indicated in the wireless connectivity map. The remote computer system (or the mobile robotic system) can then: allocate local computational resources within the mobile robotic system to interpret stock conditions in slots within an inventory structure depicted in this image and to store these stock conditions within a smaller data packet; and schedule transmission of this data packet—rather than the original raw image—to the remote computer system during the scan cycle in order to reduce the total size of data uploaded by the mobile robotic system via the wireless network and thus reduce wireless network bandwidth consumption during the scan cycle.

In one example shown in FIG. 3B, after calculating a high upload to traversal duration ratio (i.e., greater than 1.0) for a first inventory structure and a low upload to traversal duration ratio (i.e., less than 1.0) for a second inventory structure, the remote computer system (or the mobile robotic system) can: schedule upload of a first subset of images—captured by the mobile robotic system while traversing the first inventory structure—to the remote computer system during traversal and imaging of the first inventory structure by the mobile robotic system during the scan cycle; and schedule upload of a second subset of these images to the remote computer system during traversal and imaging of the second inventory structure by the mobile robotic system during the scan cycle. Furthermore, the remote computer system (or the mobile robotic system) can: schedule local interpretation, by the mobile robotic system, of stock conditions of a third subset of slots in the first inventory structure from a third subset of these images during traversal and imaging of the first inventory structure by the mobile robotic system during the scan cycle; and specify upload of stock conditions of the third subset of slots in the first inventory structure—thus interpreted locally by the mobile robotic system—to the remote computer system in place of the third subset of images during the scan cycle. For example, the remote computer system can write local image processing flags and a schedule for image uploads to the planned route for the scan cycle.

Figure 4:
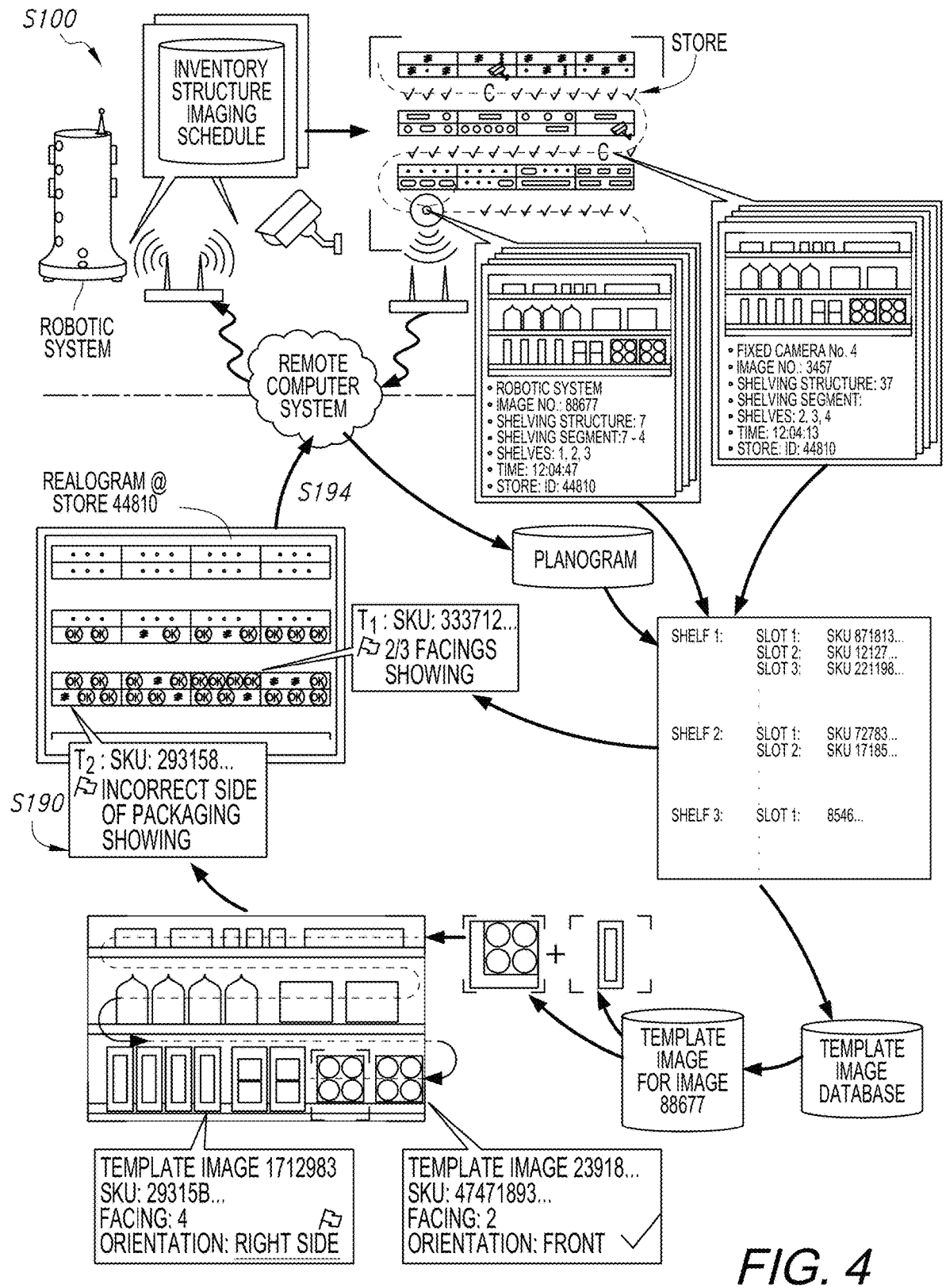
FIG. 4 is a flowchart representation of one variation of the method.
Figure 5:
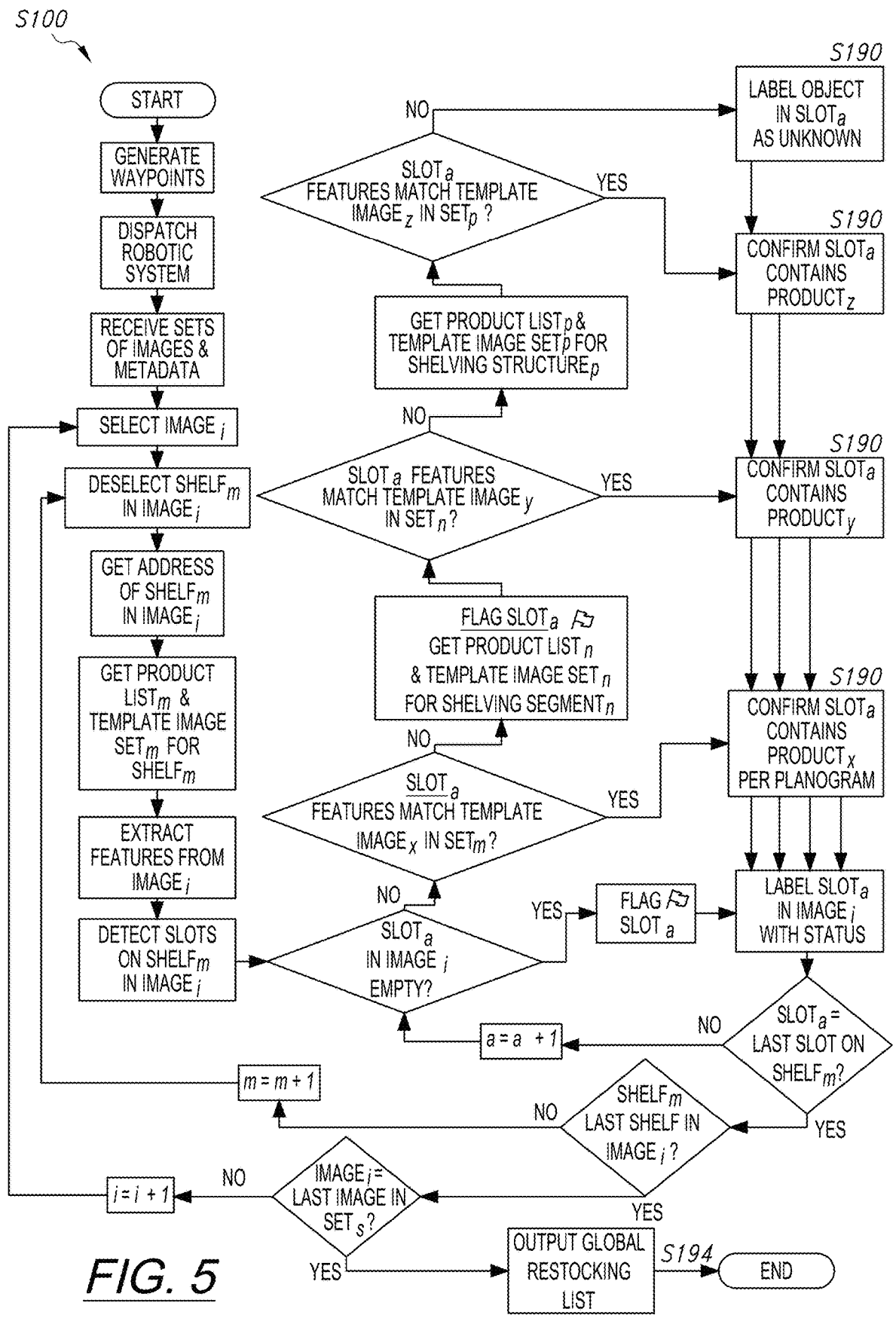
FIG. 5 is a flowchart representation of one variation of the method.

Later, while traversing the first inventory structure during this scan cycle, the mobile robotic system can capture a first image of the first inventory structure and queue the first image for local processing according to a local image processing flag stored in the planned route. Accordingly, the mobile robotic system can implement methods and techniques described in U.S. patent application Ser. No. 15/600,527 to: detect a first slot boundary, of a first slot in the first inventory structure, in a first region of this first image; extract a first set of color features, geometry features, and textual features from within the first slot boundary in the first image; identify a first product type assigned to the first slot; retrieve a first set of representative features of the first product type; detect an out-of-stock condition at the first slot in response to deviation of the first set of color features, geometry features, and textual features from the first set of representative features in Block S190; and return the out-of-stock condition at the first slot to the remote computer system in place of the first image in Block S194, as shown in FIGS. 4 and 5.

Similarly, while traversing the first inventory structure during this scan cycle, the mobile robotic system can capture a second image of the first inventory structure and queue the second image for local processing according to a raw image upload flag stored in the planned route. Accordingly, the mobile robotic system can implement similar methods and techniques to: receive the second image from the mobile robotic system during the scan cycle; detect a second slot boundary, of a second slot in the first inventory structure, in a second region of the image; extract a second set of color features, geometry features, and textual features from within the second slot boundary in the image; identify a second product type assigned to the second slot; retrieve a second set of representative features of the second product type; detect a second stock condition at the second slot based on correspondence between the second set of color features, geometry features, and textual features and the second set of representative features in Block S190; and compile the out-of-stock condition at the first slot and the second stock condition at the second slot into a global stock condition of the store in Block S194, as shown in FIGS. 4 and 5.

Alternatively, the mobile robotic system (or the remote computer system) can: characterize values of product types assigned to slots in inventory structures throughout the store; calculate aggregate values for inventory structure sections or whole inventory structures based on the values of products assigned therefore; and selectively schedule or prioritize local processing—by the mobile robotic system—of images of inventory structures characterized by high aggregate values and located in low-connectivity regions of the store, such as shown in FIG. 3B, thereby enabling the mobile robotic system to reduce time from imaging to stock condition derivation of these high-aggregate-value inventory structures and enabling the remote computer system to return actionable data for high-aggregate-value inventory structures to store associates in less time. For example, the remote computer system can implement methods and techniques described in U.S. patent application Ser. No. 15/347,689 to: calculate a first composite value (e.g., a linear combination) for a first inventory structure based on a first combination of historical sale rates and margins of each product type, in a first set of product types assigned to the first inventory structure by the planogram, at the store; and repeat this process for each other inventory structure in the store.

Yet alternatively, rather than implementing a predefined schedule, the mobile robotic system can automatically select images to process locally in real-time during the scan cycle. For example, the mobile robotic system can: capture a sequence of images; store these images in a local buffer; select and locally process a first, oldest image from the buffer; stream all other images from the buffer in order of age (i.e., timestamp); upload stock condition data extracted from the first image upon completing local processing of the first image; and repeat this process until the conclusion of the scan cycle.

17.6 Modifying Imaging Parameters Vis. Upload Duration

Additionally or alternatively, the remote computer system can selectively reduce imaging resolutions designated for particular inventory structures within the store based on upload to traversal duration ratios for the inventory structure, such as: by reducing imaging resolutions for inventory structures with higher upload to traversal duration ratios in order to reduce data size and thus reduce upload duration; or by assigning imaging resolutions to inventory structures inversely proportional to their upload to traversal duration ratios in order to reduce data size in low-connectivity regions of the store and thus achieve more consistent upload to traversal duration ratios throughout the store.

For example, as shown in FIGS. 3A and 3B the remote computer system can implement methods and techniques described above to: estimate a third traversal duration for the mobile robotic system to traverse a third inventory structure, in the set of inventory structures, and to capture a third set of images that depict product units occupying the third inventory structure within the target resolution range; estimate a third data size of the third set of images; and estimate a third upload duration for the mobile robotic system to upload the third set of images to the remote computer system via the first wireless network based on the third data size and the wireless connectivity map. Then, if the third upload duration exceeds the third traversal duration, the remote computer system can schedule capture of the third set of images—by the robotic system during the scan cycle—at a reduced resolution (e.g., less than a target or nominal resolution range) in order to reduce the third data size and the third upload duration.

Furthermore, in this example, the remote computer system can identify: a first inventory structure with a high upload to traversal duration ratio and a high aggregate value, as described above; a second inventory structure with a low upload to traversal duration ratio and a high aggregate value; and a third inventory structure with a low upload to traversal duration ratio and a low aggregate value. Accordingly, the remote computer system can schedule the mobile robotic system to: traverse and image the first inventory structure at a target (e.g., high or nominal) resolution early in the scan cycle; then traverse and image the second inventory structure at the target resolution while uploading high-resolution images of both the first and second inventory structures to the remote computer system; and then traverse and image the third inventory structure at the reduced resolution in order to reduce data size and shorten upload duration for images of the third inventory structures. Thus, the remote computer system can: order traversal and imaging of inventory structures in the store based on aggregate value of product types assigned to these inventory structures; and adjust target resolutions for imaging each inventory structure in order to balance image resolution—and therefore upload duration, processing duration, and derived stock condition accuracy—with the value of rapidly returning actionable stock condition data to store associates.

Similarly, the remote computer system can schedule capture of images of an inventory structure at a target (or nominal) resolution: if the aggregate value of this inventory structure exceeds a threshold value; or if a ratio of the aggregate value of this inventory structure to the traversal duration of this inventory structure exceeds a value to duration threshold. Conversely, in this example, the remote computer system can schedule capture of images of an inventory structure at a reduced resolution: if the aggregate value of this inventory structure is less than the threshold value; or if a ratio of the aggregate value of this inventory structure to the traversal duration of this inventory structure falls below the value to duration threshold.

17.7 Modifying Imaging Parameters Vis. Wireless Connectivity Loss

In a similar example as shown in FIG. 3A, the remote computer system can selectively assign a reduced imaging resolution, reduced image overlap, and/or reduced image density to a particular inventory structure in a region of the store characterized by loss of wireless connectivity in order to reduce a traversal duration for this inventory structure and thus reduce a duration of time that the mobile robotic system is unreachable via the wireless network during the scan cycle.

In particular, the remote computer system can: detect wireless connectivity failure proximal a particular inventory structure in the store based on the wireless connectivity map; and estimate a traversal duration for the mobile robotic system to traverse the particular inventory structure and capture a set of images that depict product units occupying the particular inventory structure within the target resolution range. In response to detecting this wireless connectivity failure proximal the third inventory structure and in response to this traversal duration exceeding a connectivity loss threshold duration preset for the mobile robotic system, the remote computer system can schedule capture of this set of images, by the robotic system during the scan cycle, at a reduced resolution less than the target resolution range (and/or at a reduced image overlap, and/or reduced image density) in order to reduce the traversal duration for the particular inventory structure to less than the connectivity loss threshold duration, as shown in FIG. 3A.

Alternatively, in this example, in response to detecting wireless connectivity failure proximal the particular inventory structure, the remote computer system can remove the particular inventory structure from the set of inventory structures scheduled for imaging by the mobile robotic system during the scan cycle, as shown in FIG. 3A.

However, the remote computer system and the mobile robotic system can implement any other method or technique to define imaging parameters, offload parameters, and/or a scan cycle route, such as prior to a scheduled scan cycle or in real-time during the scan cycle and based on any other data derived from the wireless connectivity map, the spatial map, and/or the planogram of the store.

17.8 Modifying Imaging Parameters Vis. Other Parameters

The remote computer system can implement similar methods and techniques to define imaging parameters, offload parameters, and/or a scan cycle route based on: channel switching (e.g., to limit channel switching); packet loss, packet retries, and/or erroneous packets (e.g., to reduce packet loss, packet retries, and/or erroneous packets); etc.

17.9 Time

Furthermore, the mobile robotic system can execute the foregoing methods and techniques to capture spatial wireless connectivity metrics within the store at various times of time, days of the week, months, seasons, etc. The remote computer system can then execute Blocks of the method to calculate imaging parameters, offload parameters, and/or scan cycle routes as a function of time of day, day of the week, month, season, etc., based on these spatial wireless connectivity metrics for the store. For example, because network traffic (e.g., guest traffic) within the store and network traffic through local switches and servers outside of the store may vary significantly and cyclically over time, the remote computer system can execute Blocks of the method to calculate different imaging parameters, offload parameters, and/or scan cycle routes for scan cycles executed by the mobile robotic system: during mornings and evenings; during weekdays and weekends; during summer months and winter months; during holiday weekends and non-holiday weekends; etc. The mobile robotic system can then implement these different imaging parameters, offload parameters, and/or scan cycle routes during subsequent scan cycles based on the current time of day, day of the week, month, season, etc.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for deploying a mobile robotic system to scan inventory within a store, the method comprising:
   during a mapping cycle at a mobile robotic system:
     navigating along a set of inventory structures within the store; and
     capturing a set of wireless connectivity metrics representing connectivity to a first wireless network;
   assembling the set of wireless connectivity metrics into a wireless connectivity map of the store;
   for a first inventory structure in the set of inventory structures:
     estimating a first data size of a first set of images capturable by the robotic system during a scan cycle and depicting the first inventory structure; and
     estimating a first upload duration for the mobile robotic system to upload the first set of images to a remote computer system via the first wireless network during a scan cycle based on the first data size and the wireless connectivity map;
   for a second inventory structure in the set of inventory structures:
     estimating a second data size of a second set of images capturable by the robotic system during the scan cycle and depicting the second inventory structure; and
     estimating a second upload duration for the mobile robotic system to upload the second set of images to the remote computer system via the first wireless network during a scan cycle based on the second data size and the wireless connectivity map;
   dispatching the mobile robotic system to autonomously capture images of the set of inventory structures within the store during the scan cycle; and
   scheduling upload of the first set of images from the mobile robotic system to the remote computer system, based on the wireless connectivity map of the store, the first upload duration and the second upload duration, during the scan cycle.

2. The method of claim 1, further comprising,
   estimating a first traversal duration for the mobile robotic system to traverse the first inventory structure and capture the first set of images that depict the first inventory structure within a target resolution range;

estimating a second traversal duration for the mobile robotic system to traverse the second inventory structure and capture the second set of images that depict the second inventory structure within the target resolution range; and in response to the first upload duration exceeding the first traversal duration and in response to the second traversal duration exceeding the second upload duration, scheduling traversal and imaging of the first inventory structure by the mobile robotic computer system prior to traversal and imaging of the second inventory structure by the mobile robotic computer system during the scan cycle.

3. The method of claim 1, further comprising:

estimating a first traversal duration for the mobile robotic system to traverse the first inventory structure and capture the first set of images;

estimating a second traversal duration for the mobile robotic system to traverse the second inventory structure and capture the second set of images;

in response to the first upload duration exceeding the first traversal duration and in response to the second traversal duration exceeding the second upload duration:
  scheduling upload of a subset of the first set of images from the mobile robotic system to the remote computer system during traversal and imaging of the first inventory structure by the mobile robotic system during the scan cycle;
  scheduling local interpretation, by the mobile robotic system, of stock conditions of a subset of slots in the first inventory structure from the subset of the first set of images during traversal and imaging of the first inventory structure by the mobile robotic system during the scan cycle; and
  specifying upload of stock conditions of the subset of slots in the first inventory structure to the remote computer system in place of the subset of the first set of images during the scan cycle.

4. The method of claim 1, further comprising:

estimating a traversal duration for the mobile robotic system to capture a third set of images that depict a third inventory structure within a target resolution range;

estimating a third data size of the third set of images;

estimating a third upload duration for the mobile robotic system to upload the third set of images to the remote computer system via the first wireless network based on the third data size and the wireless connectivity map; and in response to the third upload duration exceeding the traversal duration, scheduling capture of the third set of images at a second resolution less than the target resolution range.

5. The method of claim 1, further comprising:

for each inventory structure in the set of inventory structures:
  estimating a data size of a set of images of the inventory structure, captured by the mobile robotic system, that depict the inventory structure; and
  estimating an upload duration, in a set of upload durations, for the mobile robotic system to upload the set of images to the remote computer system via the wireless network based on the data size and the wireless connectivity map; and in response to the processing duration exceeding a target duration:
  identifying a particular upload duration, in the set of upload durations, representing a greatest upload duration in the set of upload durations and corresponding to a particular inventory structure in the set of inventory structures; and
  generating a recommendation to install a wireless device proximal the particular inventory structure to reduce the particular upload duration.

6. A method for deploying a mobile robotic system to scan inventory within a store, the method comprising:

capturing a set of wireless connectivity metrics, representing connectivity to a wireless network, at the mobile robotic system during a setup cycle;

assembling the set of wireless connectivity metrics into a wireless connectivity map of the store;

for a first inventory structure in a set of inventory structures:
  estimating a first data size of a first set of images of the first inventory structure, captured by the mobile robotic system, that depict the first inventory structure; and
  estimating a first upload duration for the mobile robotic system to upload the first set of images to a remote computer system via the wireless network based on the first data size and the wireless connectivity map; and estimating a processing duration from onset of a scan cycle to transformation of images of inventory structures in the store, captured by the mobile robotic system during the scan cycle, into a stock condition of the store based on the first upload duration.

7. The method of claim 6, further comprising:

dispatching the mobile robotic system to autonomously capture images of the set of inventory structures within the store during the scan cycle based on the processing duration.

8. The method of claim 6, further comprising, at the mobile robotic system during the scan cycle:

capturing a first image in the first set of images of the first inventory structure;

detecting a first slot within the first image;

extracting a first set of features from within the first slot in the image;

retrieving a first set of representative features assigned to the first slot;

detecting an out-of-stock condition at the first slot in response to deviation of the first set of features from the first set of representative features; and returning the out-of-stock condition at the first slot to the remote computer system in place of the image.

9. The method of claim 8, further comprising, at the remote computer system:

receiving a second image, in the first set of images of the first inventory structure, captured by the mobile robotic system during the scan cycle;

detecting a second slot within the second image;

extracting a second set of features from within the second slot in the image;

retrieving a second set of representative features assigned to the second slot;

detecting a second stock condition at the second slot based on correspondence between the second set of features and the second set of representative features; and compiling the out-of-stock condition at the first slot and the second stock condition at the second slot into a global stock condition of the store.

10. The method of claim 6, further comprising, at the remote computer system:
- receiving an image, of the first inventory structure, captured by the mobile robotic system during the scan cycle;
- detecting a slot within the first image;
- extracting a set of features from within the slot in the image;
- retrieving a set of representative features of a product type assigned to the slot;
- detecting an out-of-stock condition at the slot in response to deviation of the set of features from the set of representative features; and
- in response to detecting the out-of-stock condition, generating a prompt to restock the slot with product units of the product type.

11. The method of claim 6:
- wherein estimating the processing duration from onset of a scan cycle to transformation of images of inventory structures in the store comprises:
  - for each inventory structure in the set of inventory structures:
    - estimating a data size of the set of images; and
    - estimating an upload duration, in a set of upload durations, for the mobile robotic system to upload the set of images to the remote computer system via the first wireless network based on the data size and the wireless connectivity map; and
  - estimating the processing duration based on the set of upload durations.

12. The method of claim 6, further comprising, in response to the processing duration exceeding a target duration:
- identifying a particular upload duration, in the set of upload durations, representing a greatest upload duration in the set of upload durations and corresponding to a particular inventory structure in the set of inventory structures; and
- generating a recommendation to install a wireless device proximal the particular inventory structure to extend wireless connectivity and reduce the particular upload duration.

13. The method of claim 6, further comprising, in response to the processing duration exceeding a target duration, generating a recommendation to enable upload of images from the mobile robotic system to the remote computer system via a second wireless network during traversal of the particular inventory structure by the mobile robotic system during the scan cycle.

14. The method of claim 13, further comprising, in response to confirmation of access to the second wireless network by the mobile robotic system, scheduling upload of images captured by the mobile robotic system to the remote computer system via the second wireless network during the scan cycle.

15. The method of claim 13, further comprising, in response to confirmation of access to the second wireless network by the mobile robotic system, scheduling upload of a first subset of images captured by the mobile robotic system to the remote computer system via the first wireless network during the scan cycle and scheduling upload of a second subset of images captured by the mobile robotic system to the remote computer system via the second wireless network during the scan cycle.

16. The method of claim 6, further comprising:
- accessing a scheduled restocking period in the store;
- calculating a scan cycle start time preceding the scheduled restocking period by greater than the processing duration; and
- triggering the mobile robotic system to initiate the scan cycle at the scan cycle start time.

17. The method of claim 6, further comprising:
- based on the wireless connectivity map, detecting wireless connectivity failure proximal a third inventory structure in the set of inventory structures;
- based on wireless connectivity failure proximal the third inventory structure, scheduling capture of the third set of images, by the robotic system during the scan cycle, at a reduced resolution less than the target resolution range.

18. The method of claim 6, further comprising:
- based on the wireless connectivity map, detecting wireless connectivity failure proximal a third inventory structure in the set of inventory structures; and
- in response to detecting wireless connectivity failure proximal the third inventory structure, removing the third inventory structure from the set of inventory structures scheduled for imaging by the mobile robotic system during the scan cycle.

19. A method for deploying a robotic system to scan inventory within a store, the method comprising:
- accessing a spatial map generated based on optical data captured by the robotic system while traversing the store during a mapping cycle;
- defining a set of image capture parameters based on the spatial map;
- accessing a wireless connectivity map generated based on connectivity data of a wireless network captured by the robotic system while traversing the store during the mapping cycle;
- estimating wireless network connectivity requirements to upload images, captured according to the set of image capture parameters, during traversal of the store by the robotic system;
- calculating a route, along inventory structures in the store, characterized by reduction of differences between:
  - wireless network connectivity requirements to upload images during traversal of the store by the robotic system; and
  - wireless network connectivity represented in the wireless connectivity map; and
- scheduling the robotic system to execute a scan cycle in the store according to the route and the set of image capture parameters.

20. The method of claim 19, further comprising:
- based on the wireless connectivity map, detecting wireless connectivity failure proximal a third inventory structure in the set of inventory structures; and
- in response to detecting wireless connectivity failure proximal the third inventory structure, removing the third inventory structure from the route.

* * * * *